United States Patent
Gianchandani et al.

(10) Patent No.: US 6,624,377 B2
(45) Date of Patent: Sep. 23, 2003

(54) MICRO-ELECTRO-DISCHARGE MACHINING METHOD AND APPARATUS

(75) Inventors: Yogesh B. Gianchandani, Madison, WI (US); Kenichi Takahata, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 09/872,734

(22) Filed: Jun. 1, 2001

(65) Prior Publication Data

US 2002/0179573 A1 Dec. 5, 2002

(51) Int. Cl.[7] .................................................. B23H 1/02
(52) U.S. Cl. .................................. 219/69.13; 219/69.15
(58) Field of Search ........................... 219/69.13, 69.18, 219/69.15, 69.17

(56) References Cited

U.S. PATENT DOCUMENTS

| | | | | |
|---|---|---|---|---|
| 3,472,994 A | * | 10/1969 | Sennowitz | 219/69.13 |
| 5,206,983 A | | 5/1993 | Guckel et al. | |
| 5,286,944 A | * | 2/1994 | Li | 219/69.15 |
| 5,357,073 A | * | 10/1994 | Tominaga et al. | 219/69.15 |
| 5,378,583 A | | 1/1995 | Guckel et al. | |

FOREIGN PATENT DOCUMENTS

| | | | | |
|---|---|---|---|---|
| GB | 1389028 A | * | 4/1975 | 219/69.15 |
| JP | 58-186532 A | * | 10/1983 | 219/69.15 |
| JP | 59-227320 A | * | 12/1984 | 219/69.13 |
| JP | 2000-2-2718 | | 7/2000 | |

OTHER PUBLICATIONS

Takahisa Masuzawa, et al., "The Occurring Mechanism of the Continuous Arc in Micro–Energy EDM by RC Circuit," J. of Electrical Machining, vol. 5, No. 9, 19 , pp. 35–51 (in Japanese, with English abstract).

H. Guckel, et al., "On the Application of Deep X–Ray Lithography with Sacrificial Layers to Sensor and Actuator Construction (The Magnetic Micromotor with Power Take-offs)," IEEE Intl. Conf. on Solid–State Sensors and Actuators (Transducers '91), paper substitutions, San Francisco, California, Jun. 1991.

(List continued on next page.)

Primary Examiner—Geoffrey S. Evans
(74) Attorney, Agent, or Firm—Foley & Lardner

(57) ABSTRACT

A micro-electro-discharge machining apparatus includes a substrate, a plurality of electrically conductive electrodes on the substrate arranged in an array, and a plurality of electrical interconnect lines formed on the substrate extending to one or more of the electrodes. An electrical power source is connected from one of its terminals through a resistor to each of the interconnect lines and from its other terminal to a workpiece to be machined. The electrodes connected to different interconnect lines may charge and discharge independently of each other, speeding up the machining process. An interconnect line may extend individually to each electrode so that all of the electrodes can charge and discharge independently of the others. The capacitor that is charged to produce the discharge voltage may be a separate discrete capacitor or a conductive substrate.

46 Claims, 10 Drawing Sheets

OTHER PUBLICATIONS

Kenichi Takahata, et al., "A Novel Micro Electro–Discharge Machining Method Using Electrodes Fabricated by the LIGA Process," Tech. Dig., IEEE Intl. Conf. on Micro Electro Mechanical Systems (MEMS '99), Orlando, Florida, Jan., 1999, pp. 238–243.

K. Takahata, et al., "High–Aspect–Ratio WC–Co Microstructure Produced by the Combination of LIGA and Micro–EDM," Microsystem Technologies, vol. 6, No. 5, Aug., 2000, pp. 175–178.

U.S. patent application Ser. No. 09/482,436, filed Jan. 13, 2000, by Kenichi Takahata, entitled Method of Manufacturing Machining Tool Electrode and Machining Method.

Wolfgang Ehrfeld, et al., "Micro Electro Discharge Machining as a Technology in Micro Machining," SPIE Micro Machining and Micro Fabrication Process Technology II, Austin, Texas, Oct. 14–25, 1996, SPIE vol. 2879, pp. 332–337, 1996.

A. Wolf, et al., "Application of New Actuator and Vision Control Systems for Micro Electro Discharge Machining," SPIE Conference on Intelligent Systems in Design and Manufacturing, Boston, Massachusetts, Nov. 1998, SPIE vol. 3517, pp. 149–157, 1998.

O. Koch, et al., "Micro–Electro Discharge Machining—Application, Strategy and Technology," IWMF 2000, 2nd International Workshop on Micro Factories, Fribourg, Switzerland, Oct. 9–10, 2000.

* cited by examiner

MICRO-ELECTRO-DISCHARGE MACHINING METHOD AND APPARATUS

This invention was made with United States government support awarded by the following agency: NSF Grant No: 9985422. The United States has certain rights in this invention.

FIELD OF THE INVENTION

This invention pertains generally to the field of electro-discharge machining and to micro-electromechanical devices and processes for producing such devices.

BACKGROUND OF THE INVENTION

Micro-electro-discharge machining (micro-EDM) is a microfabrication technique that is well suited to cutting electrically conductive materials such as steel, graphite, silicon and magnetic materials. See, e.g., D. Reynaerts, et al., "Integrating Electro-Discharge Machining and Photolithography: Work in Progress," J. of Micromechanics and Microengineering, Vol. 10, No. 2, June, 2000, pp. 189–195; Y. Honma, et al., "Micro-Machining of Magnetic Metal Film Using Electro-Discharge Technique," Advances in Information Storage Systems, Vol. 10, 1999, pp. 383–399; C. A. Grimes, et al., "Magnetoelastic Microsensors for Environmental Monitoring," Tech. Dig., IEEE Intl. Conf. on Micro Electro Mechanical Systems (MEMS '01), Interlaken, Switzerland, January, 2001, pp. 278–281. Micro-EDM involves the sequential discharge of electrical pulses between a microscopic electrode and the workpiece while both are immersed in a dielectric oil. See, generally, T. Masaki, et al., "Micro Electro-Discharge Machining and its Applications," Proc., IEEE Intl. Conf. on Micro Electro Mechanical Systems (MEMS '90), Napa Valley, Calif., February, 1990, pp. 21–26. The pulse discharge timing is controlled by a simple resistor-capacitor (RC) circuit. In conventional micro-EDM, the electrode is a cylindrical metal element from 5 to 300 $\mu$m in diameter. Although micro-EDM has been used commercially for applications such as ink-jet nozzle fabrication, the traditional process is limited in throughput because it is a serial process. The use of a single electrode limits not only the throughput, but also precision, because the electrodes themselves are individually shaped by using a micro-EDM technique—wire electrode-discharge grinding (WEDG)—and variation may occur in the electrode shape. See, e.g., T. Masuzawa, et al., "Wire Electro-Discharge Grinding for Micro-Machining," Ann. CIRP, Vol. 34, 1985, pp. 431–434.

To address the throughput and material issues that limit conventional micro-EDM, batch mode micro-EDM has been developed using LIGA-fabricated electrodes. The LIGA process uses x-ray lithography to form high aspect ratio molds for electroplated structures. For a general discussion of the LIGA process, see W. Ehrfeld, et al., "LIGA Process: Sensor Construction Techniques via X-Ray Lithography," Tech. Dig., IEEE Intl. Conf. on Solid-State Sensors and Actuators Workshop (Hilton Head '88), June, 1988, pp. 1–4. Electroplated copper electrodes formed using the LIGA process have been shown to provide acceptable wear resistance. K. Takahata, et al., "A Novel Micro Electro-Discharge Machining Method Using Electrodes Fabricated by the LIGA Process," Tech. Dig., IEEE Intl. Conf. on Micro Electro Mechanical Systems (MEMS '99), Orlando, Fla., January, 1999, pp. 238–243. Parallel machining to provide perforations in stainless steel by using 3×4 arrayed electrodes with 100 $\mu$m diameter and 500 $\mu$m pitch was also demonstrated. Sequential application with electrode arrays has also been utilized to produce a 1-mm long WC-Co super-hard alloy mechanical processing tool. K. Takahata, et al., "High-Aspect-Ratio WC-Co Microstructure Produced by the Combination of LIGA and Micro-EDM," Microsystem Technologies, Vol. 6, No. 5, August, 2000, pp. 175–178.

SUMMARY OF THE INVENTION

A micro-electro-discharge machining apparatus in accordance with the invention includes a substrate having an array of electrodes formed thereon, with a plurality of electrical interconnect lines formed on the substrate extending to each of the electrodes. One interconnect line may extend to a set of electrodes or, preferably, each interconnect line extends separately to a single electrode. An electrical power source has a terminal connected through a resistor to each of the interconnect lines and has its other terminal connected to the workpiece to be machined. A capacitor is connected between each of the interconnect lines and a terminal of the power source and forms, with the resistor, an RC circuit which charges each of the electrodes to a voltage level sufficient to provide an electrical discharge between the electrode and the workpiece. By utilizing multiple interconnect lines rather than a single conductive baseline to which all of the electrodes are connected, several electrodes can be charged individually to a voltage level sufficient to provide a discharge, greatly increasing the rate of machining and reducing processing time. Most preferably, each electrode is connected individually to an interconnect line which is connected through a resistor to the power source.

A discrete capacitor may be utilized as the charging capacitor, with one such capacitor connected between each of the interconnect lines and the positive terminal of the power source. The apparatus of the invention may also utilize a conductive substrate, such as doped silicon, on which an insulating layer (e.g., $SiO_2$) is formed, with the interconnect lines and the electrodes formed on the insulating layer. A distributed capacitor is formed between each of the interconnect lines and the conductive substrate, and this capacitor may be utilized as the capacitor which is charged, eliminating the need for a separate discrete capacitor and allowing the discharge pulse current amplitude and duration to be controlled to a desired level to control the machining characteristics of the apparatus.

In accordance with the invention, distributed capacitors may be formed on a dielectric substrate by providing a conductive layer on the surface of the substrate, which acts as one plate of the distributed capacitors. An insulating layer is then formed over the conductive layer and the interconnect lines are formed on the insulating layer and form the other plates of the distributed capacitors. The resistors may also be integrated with the interconnect lines on the substrate, for example, by depositing polysilicon on the substrate which bridges the gap in and is thus connected in the interconnect lines, or by doping a segment of a semiconductor substrate to form a resistor which is connected in an interconnect line. By utilizing resistors formed on the substrate in each interconnect line, the number of contact pads required may be less than the number of interconnect lines, with one pad connected to several interconnect lines.

Further objects, features and advantages of the invention will be apparent from the following detailed description when taken in conjunction with the accompanying drawings.

DETAILED DESCRIPTION OF THE INVENTION

Figure 1:
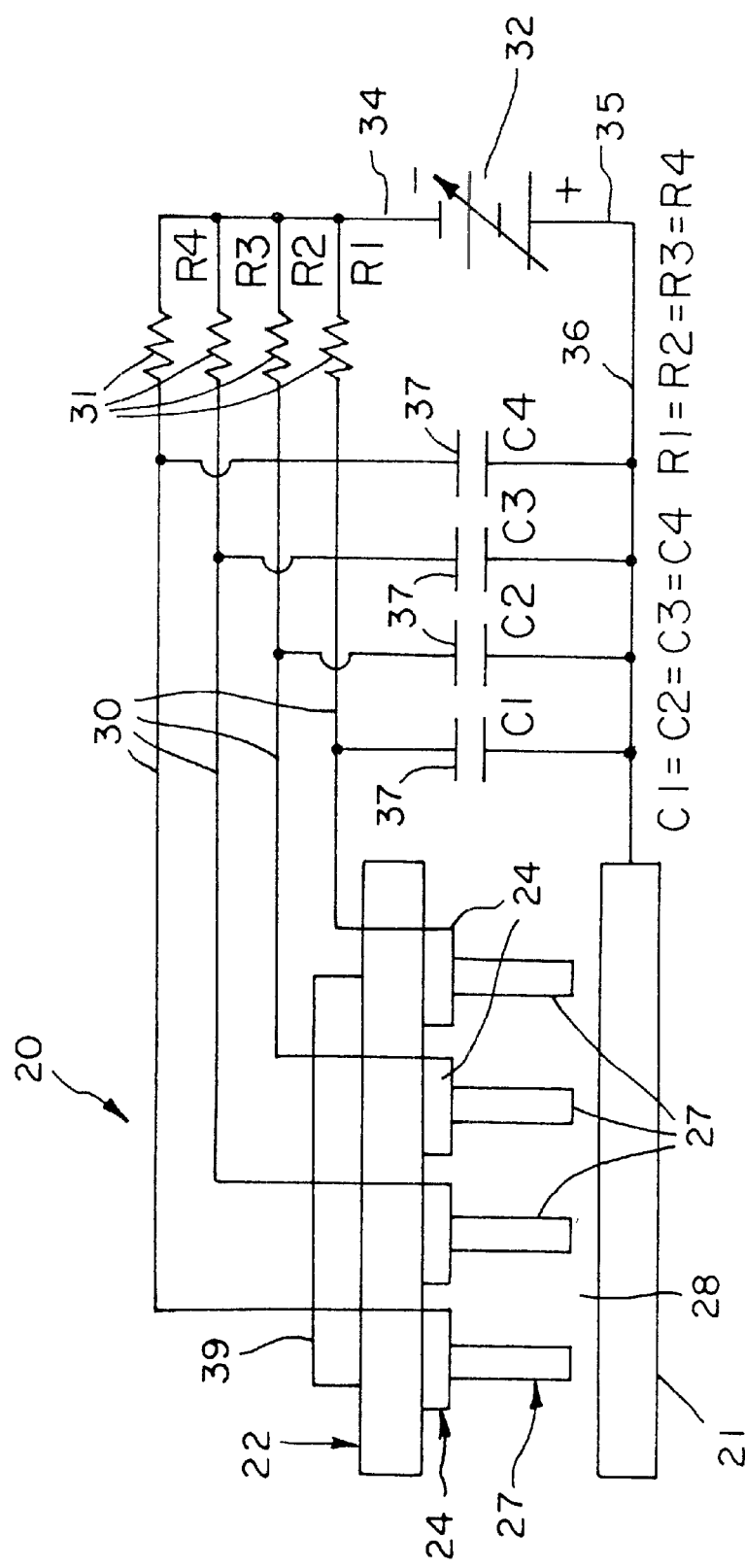
FIG. 1 is a schematic view of micro-electro-discharge machining apparatus in accordance with the invention.
Figure 2:
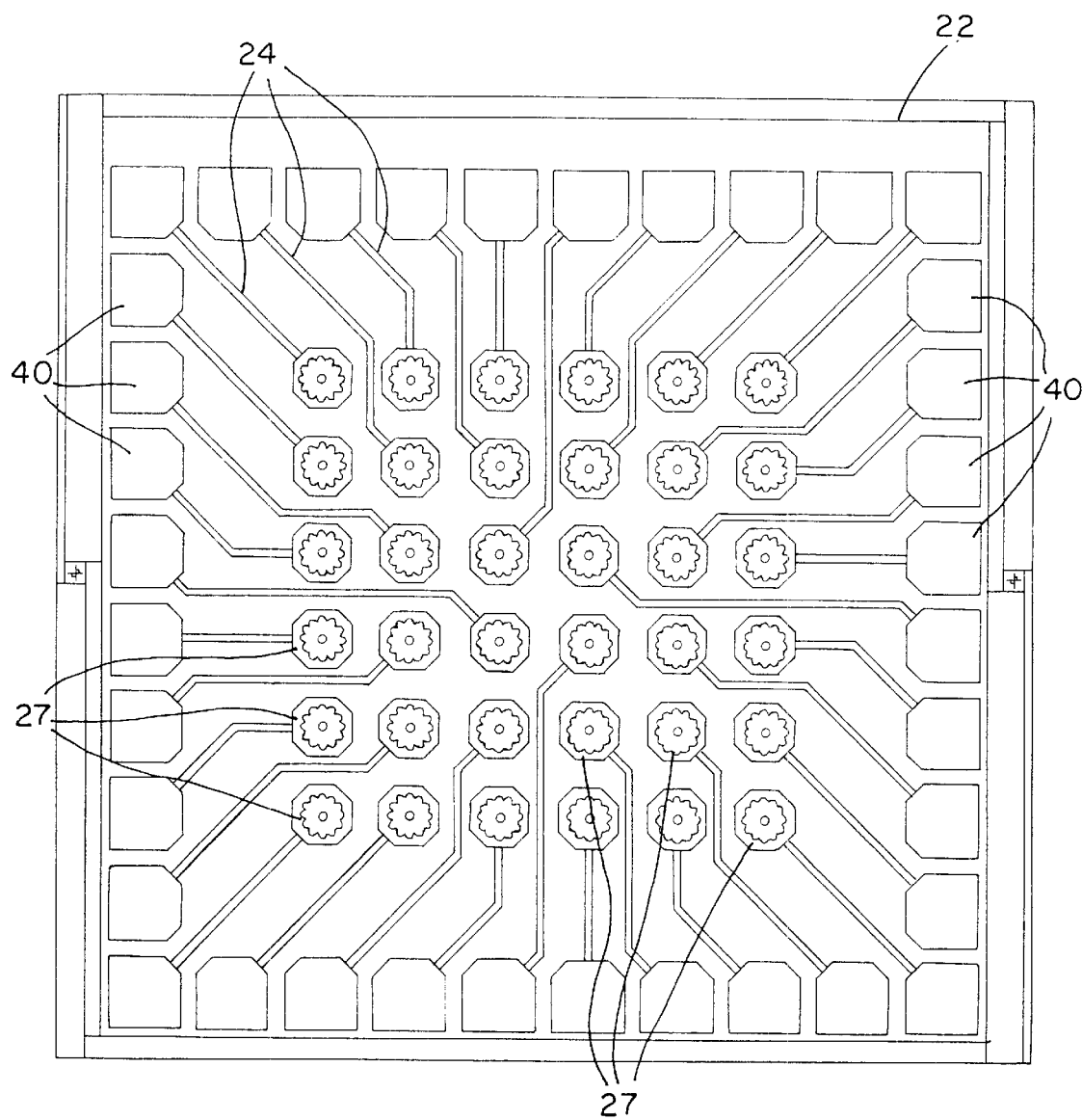
FIG. 2 is a view of an exemplary array of electrodes and interconnect lines formed on a substrate in accordance with the invention.
Figure 3:
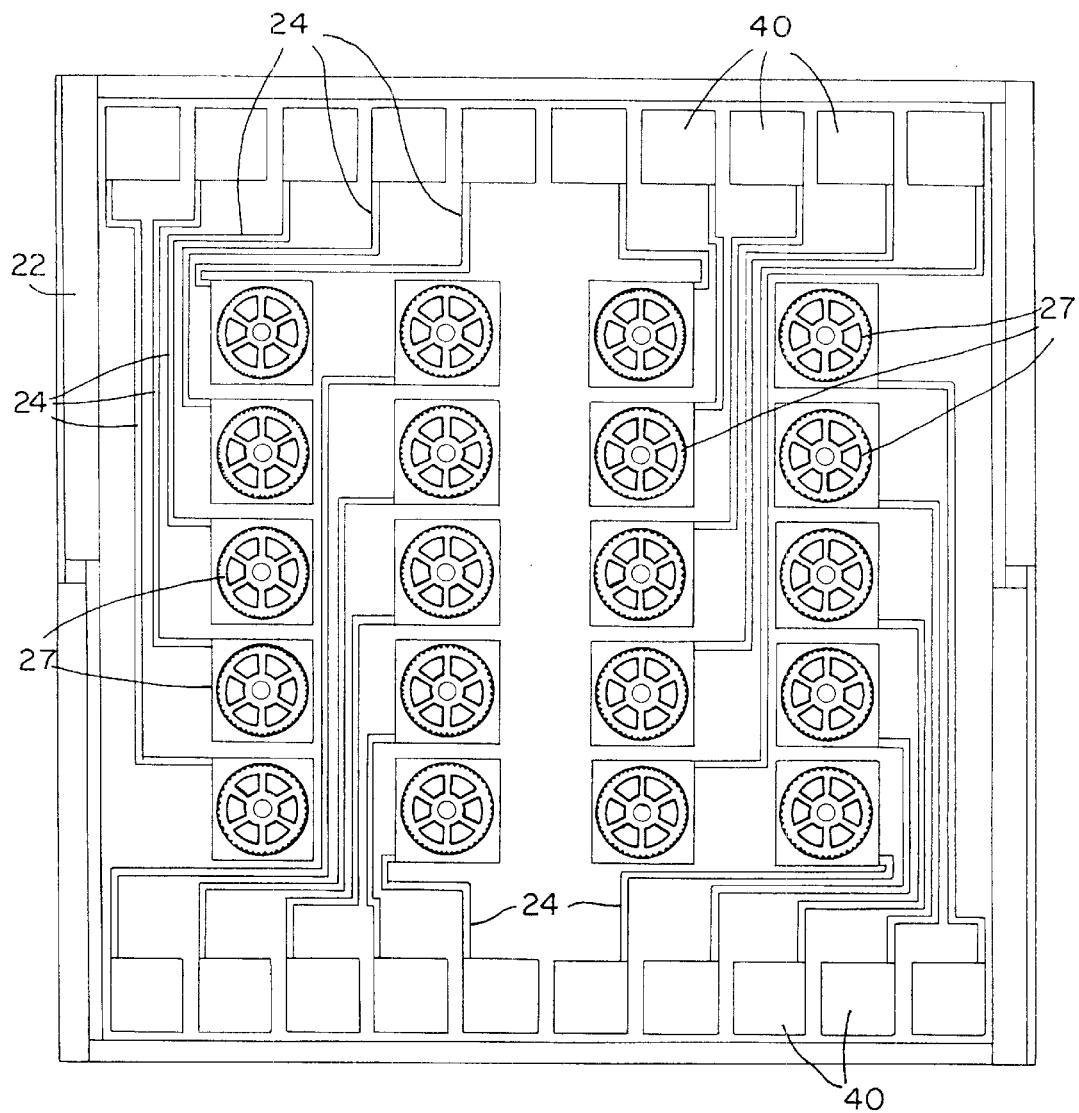
FIG. 3 is a view of another exemplary array of electrodes and interconnect lines formed on a substrate in accordance with the invention.

With reference to the drawings, a simplified schematic diagram of micro-electro-discharge machining apparatus in accordance with the invention is shown generally at 20 in FIG. 1 in position to carry out micromachining operations on a workpiece 21. The apparatus 20 includes a substrate 22 which may be a dielectric material such as glass or other insulator, a semiconductor such as silicon or, as described further below, a conductive material such as doped silicon with an insulating layer thereover. A plurality of conductive base interconnects 24 (four shown) are formed on the face surface 25 of the substrate 22. A plurality of electrically conductive electrodes 27 are formed on the base interconnects 24. One electrode 27 may be mounted to each one conductive base interconnect 24, as shown in FIG. 1, or several electrodes may be mounted to each base interconnect as discussed further below. A dielectric oil 28 occupies the space between the electrodes and the workpiece 21, e.g., by immersing the apparatus in dielectric oil held in a container (not shown). Each of the conducting interconnects 24 (which may comprise conducting lines, as discussed below) is connected by an individual conducting line 30 through a resistor 31 to a DC electrical power source 32, e.g., a battery, a voltage regulated power supply, etc. The power source 32 provides a DC output voltage between its negative terminal 34 and its positive terminal 35. The negative terminal 34 of the power source 32 is electrically connected via the resistors 31 and the conductors 30 to the interconnect lines 24, connecting them to the power source 32 in parallel with each other, and the positive terminal 35 of the power source 32 is connected via a conducting line 36 to the workpiece 21. The workpiece 21 may be formed of any of the various types of conducting materials that may be machined by electro-discharge machining. Although the negative terminal of the power source is typically connected to the electrodes so that the discharge of electrons occurs from the electrode to the workpiece, for some types of materials to be machined, it may be preferable to connect the negative terminal to the workpiece and the positive terminal to the electrodes. A capacitor 37 is connected between each of the conducting lines 30 and the conducting line 36 connected to the workpiece 21 so that individual RC circuits are provided for each of the electrodes 27 (for the arrangement shown in FIG. 1). A vibrator 39 is preferably mounted to the substrate 22 to vibrate the substrate and the electrodes in back and forth motion along the axis of the electrodes 27, that is, in a direction perpendicular to the face surface 25 of the substrate. Alternatively, the workpiece 21 may be vibrated. The vibratory motion of the electrodes (or workpiece) provided by the vibrator serves a purpose similar to rotation of a single electrode in conventional micro-EDM, i.e., to prevent local welding of the electrodes to the workpiece. An example of a commercial vibrator that can be utilized is a High Speed Vibration Unit available from Panasonic Factory Automation Co., Franklin Park, Ill. with a 100 Hz, 15 $\mu$m amplitude (available up to 30 $\mu$m amplitude). As in conventional micro-EDM, the workpiece 21 and the electrodes 27 are immersed in a dielectric oil 28 through which the electrical discharge passes between the electrodes and the workpiece (e.g., kerosene based dielectric oil EDM-185 from Commonwealth Oil Company, Ontario, Canada through Intech EDM, Broadview, Ill. By utilizing an individual RC circuit for each electrode 27, each of the electrodes 27 can discharge independently of the other electrodes, greatly increasing the speed of operation of the machining process. Although four electrodes are shown in FIG. 1 for simplicity of illustration, a large array of many electrodes 27 may be formed. Examples of such arrays are illustrated in FIGS. 2 and 3, in which individual interconnect lines 24 are formed on substrates 22 leading from contact pads 40 (similar to conventional contact pads for integrated circuit connections to a semiconductor chip) to the electrodes 27. Because each of the electrodes 27 is connected in its own RC circuit independently of the other electrodes, each electrode will discharge at a rate determined by the RC circuit for that electrode.

Figures 4, 5:
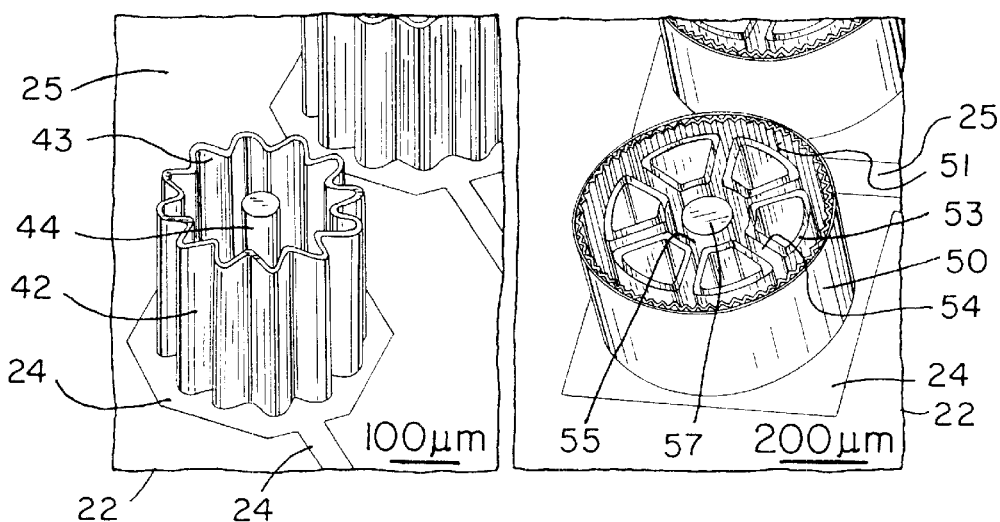
FIG. 4 is a view of an exemplary electrode that may be utilized in the invention.
FIG. 5 is a view of another form of electrode which may be utilized in the invention.
Figure 6:
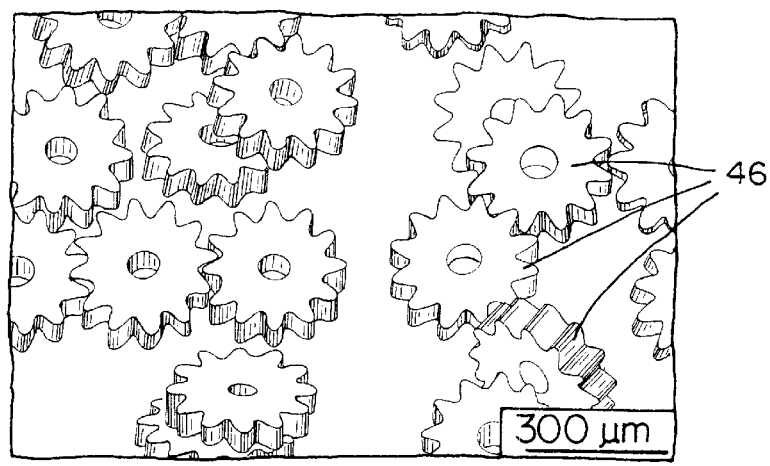
FIG. 6 are illustrative views of gears cut utilizing the electrode of FIGS. 2 and 4.

The electrodes in accordance with the invention may be formed in any desired peripheral shape to form openings of a desired shape in the workpiece, and can also be formed to cut parts which are then freed from the workpiece. Generally, the height of the electrodes and the spacing between adjacent electrodes is less than 500 μm, although larger electrode structures and greater spacings may be utilized. Examples of electrode configurations that may be utilized to cut shaped parts from a workpiece are shown in more detail in FIGS. 4 and 5, corresponding to the electrodes 27 in the arrays of FIGS. 2 and 3, respectively. The electrode of FIG. 4 has an outer peripheral wall 42 having a crenellated shape with an inner surface 43 that surrounds a cavity defining the shape of a gear. A central core 44 of the electrode is spaced inwardly from the inner surface 43 of the outer peripheral wall 44 to cut a central opening in the gear by which the gear can be mounted on a hub. Microformed gears 46 (having, e.g., an outermost diameter of 300 μm) that are cut from a workpiece utilizing the electrode of FIG. 4 are shown in FIG. 6. FIG. 5 shows another example of an electrode for cutting a gear from a workpiece. The electrode of FIG. 5 has an outer peripheral wall 50 having an inner surface 51 that will define the teeth of the gear, and inner walls 53 which surround open cavities and which are spaced from each other by openings 54 which extend from a central opening 55 that surrounds a central core 57. The electrode of FIG. 4 is formed to cut a gear with spokes extending from a central hub as illustrated at 59 in FIG. 7.

Figure 8:
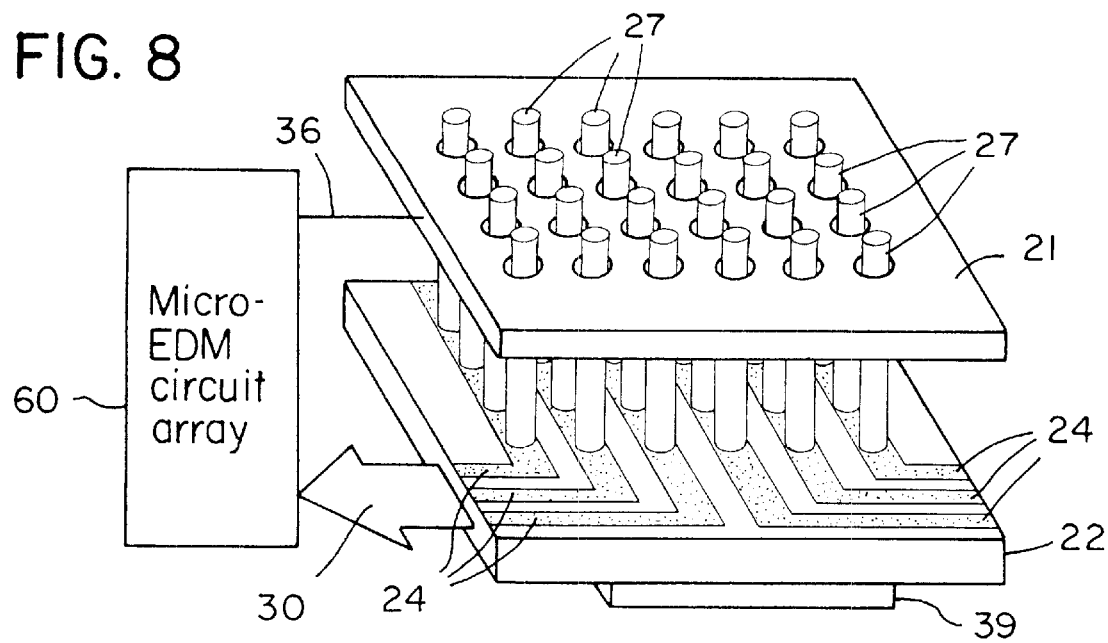
FIG. 8 is a simplified perspective view of an apparatus in accordance with the invention having multiple electrodes connected to each interconnect line.

In accordance with the invention, several electrodes in an array of electrodes may be electrically connected to an interconnect line to reduce the total number of interconnect lines. An example of such an arrangement is shown in FIG. 8 in which the electrodes 27 in each column of a 4×6 array of electrodes are electrically connected to a single interconnect line 24. Each of the lines 24 is separately connected to an RC circuit supplied from a power source within a circuit array 60. The four commonly connected electrodes in each of the columns discharge sequentially, but each column of electrodes is supplied independently of other columns, thereby significantly increasing the overall part production speed of the micromachining process as compared to a single interconnect base supplying voltage to all of the electrodes in the array.

For exemplification, the micro-EDM arrays as shown in FIGS. 2–5 can be formed utilizing lithographically patterned thin film interconnects 24 with LIGA-fabricated electrodes. The electrodes are fabricated utilizing a two-mask sequence similar to the sacrificial LIGA process as described in, e.g., H. Guckel, et al., "On the Application of Deep X-Ray Lithography with Sacrificial Layers to Sensor and Actuator Constructions (The Magnetic Micromotor with Power Takeoffs)," IEEE Intl. Conf. on Solid-State Sensors and Actuators (Transducers '91), paper substitutions, San Francisco, Calif., 1991, and U.S. Pat. Nos. 5,206,983 and 5,378,583, incorporated herein by reference. For example, the interconnect pattern may be formed on a 0.5 μm thick oxide insulating layer on a crystalline silicon substrate by etching a Ti/Cu (about 1 μm thick) electroplating base to form the interconnects 24. The following is an example of a process that may be used to form the electrodes and interconnects.

1. Silicon dioxide (SiO$_2$) with 0.5 μm thickness is formed on a highly doped (e.g., with boron) Si substrate by a thermal oxidation process. Then Ti (200 Å)/Cu (1 μm)/Ti (600 Å) are sputtered on the SiO$_2$ layer. Photoresist is spin-coated on the top Ti surface and the interconnect pattern is formed by ultraviolet exposure and development of the photoresist.

2. Ti and Cu layers are etched by reactive ion etching (RIE) and wet etching, respectively.

3. A piece of polymethylmethacrylate (PMMA) as a photoresist is glued down on a substrate with a patterned Ti/Cu layer, then cut down to the desired thickness by a milling machine.

4. PMMA is exposed by X-rays through an X-ray mask that is aligned to the pattern of Ti/Cu on the substrate.

5. Exposed PMMA is developed until all PMMA in exposed areas is gone.

6. Ti layer on bottom of PMMA recesses is etched by RIE.

7. Cu for the electrodes is electroplated on the Cu layer in a copper sulfate bath with a current density of 20 mA/cm$^2$. The plating process is done when all plating areas are over-plated.

8. Over-plated copper is removed by lapping and polishing with diamond slurry.

9. Copper electrode structures are obtained by dissolving all of the remaining PMMA.

10. Patterned interconnect is obtained by wet etching of Ti layer on SiO$_2$ layer.

Figure 7:
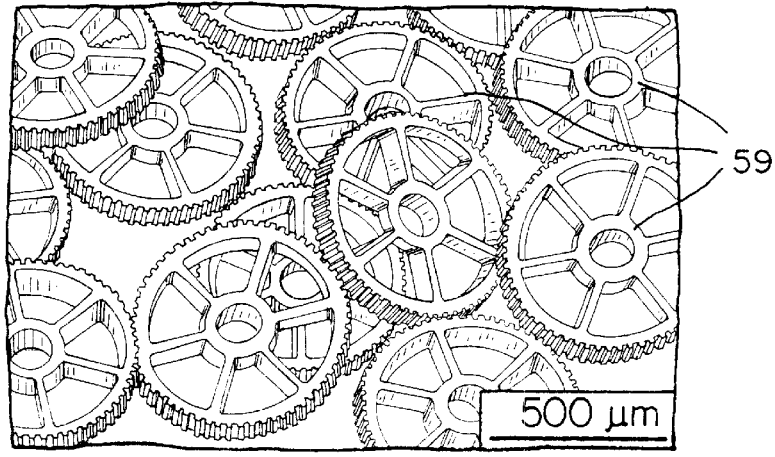
FIG. 7 are illustrative views of gears cut utilizing the electrode of FIGS. 3 and 5.

Exemplary copper electrodes were formed as shown in FIGS. 4 and 5 having a 10 μm peripheral wall thickness and 300 μm height (the distance the gears extend above the top surface 25 of the substrate). The connection to external pulse timing circuits is made by wire bonding to the contact pads 40 along the perimeter of the array. Using these electrodes, 70 μm thick WC-Co gears were produced as shown in FIGS. 6 and 7, with a sample of 36 gears of the type shown in FIG. 6 being cut in parallel in 15 minutes using four RC circuits, and a sample of the gears of FIG. 7 being formed in about 50 minutes utilizing four circuits, with the longer cutting time due to the larger surface area of the gears of FIG. 7. Such production times represent about a 100 times faster production rate than is obtainable with the use of a single conventional electrode.

Figure 9:
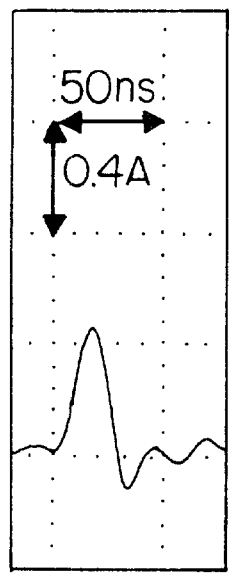
FIG. 9 is a trace of the discharge current at the workpiece utilizing an array of electrodes which are connected in common to a conductive base interconnect.
Figure 10:
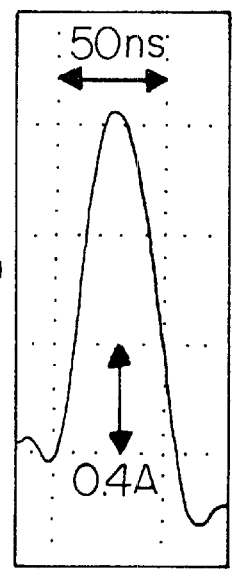
FIG. 10 is the trace of the discharge current at an electrode which is individually connected by an interconnect line utilizing a discrete capacitor where several electrodes and RC pairs are used simultaneously.
Figure 11:
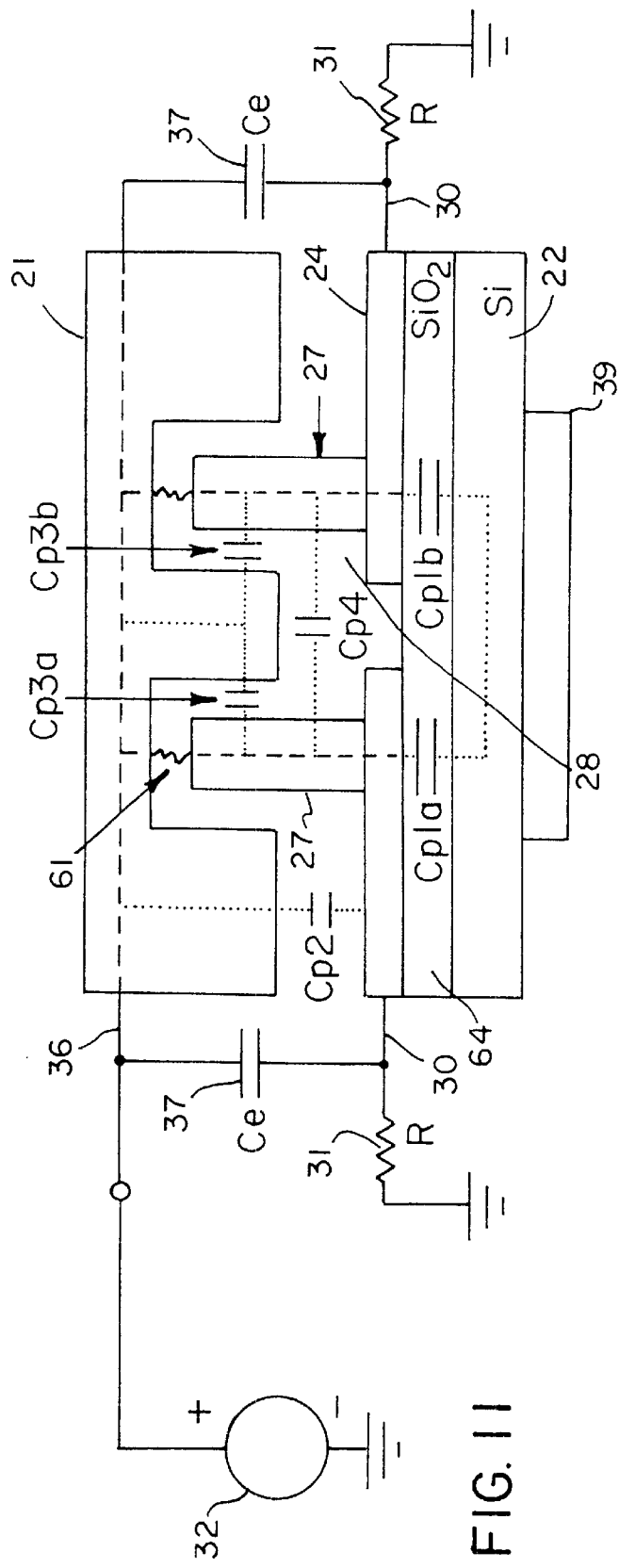
FIG. 11 is an illustrative side view of micro-electro-discharge machining apparatus utilizing separate discrete capacitors and illustrating the parasitic capacitances between the substrate and the interconnect lines and between the workpiece and the electrodes.

The utilization of multiple RC circuits for individually supplying the electrodes can affect the shape of the pulse discharge for lithographically fabricated electrode arrays with patterned interconnects. FIG. 9 shows the trace of a single current pulse triggered by discharge from an electrode, as measured at the workpiece where it connects to an external lead, for an array of several electrodes which are supplied from a common interconnect. FIG. 10 shows a similar trace of a single current pulse triggered by the discharge from an electrode, measured at the workpiece where it connects to an external lead, for an electrode that is connected individually to an RC supply circuit where many electrodes and RC pairs are used simultaneously. The increase in pulse amplitude and duration for the current pulse of FIG. 10 as compared to the pulse of FIG. 9 increases the net energy per discharge to a level that may affect the surface quality of the machined part. This increase in pulse discharge energy can be largely attributed to the parasitic capacitance associated with the thin film interconnect 24. As shown in FIG. 11, $C_{p1a}$, $C_{p1b}$, etc., the capacitance between this metal layer 24 and the (e.g., silicon) substrate 22 exists essentially in parallel with the external capacitance, $C_e$, of the capacitor 37; this capacitance $C_e$, together with the resistance R of the external resistor 31, is intended to control the pulse timing. The values of the $C_{p1}$ capacitances can be significant, increasing the total capacitance of the RC circuit for each electrode so as to result in the increased pulse amplitude and duration illustrated in FIG. 10. Other parasitic capacitances between the workpiece and various facets of the electrode ($C_{p2}$, $C_{p3}$, $C_{p4}$ as shown in FIG. 11), are typically 100 to 10,000 times smaller than $C_{p1a}$, etc. Furthermore, the silicon substrate 22, which is electrically floating in the conventional micro-EDM system, connects all of the $C_{p1}$ elements together for each of the electrodes, and provides a path for cross-talk between the electrodes 27 that can affect pulse timing. For example, a discharge arc (illustrated at 61 in FIG. 11) may raise the potential of one electrode 27, but capacitive coupling through the series combination of $C_{p1a}$ and $C_{p1b}$ may also elevate the voltage of the neighboring electrode, temporarily suppressing a discharge there. For example, for an electrode structure of the type discussed above, the measured value of this series combination of $C_{p1a}$ and $C_{p1b}$ was found to be 95 pF, which means that a single $C_{p1a}$ is about 190 pF because every segmented interconnect and contact pad has the same area.

Figure 12:
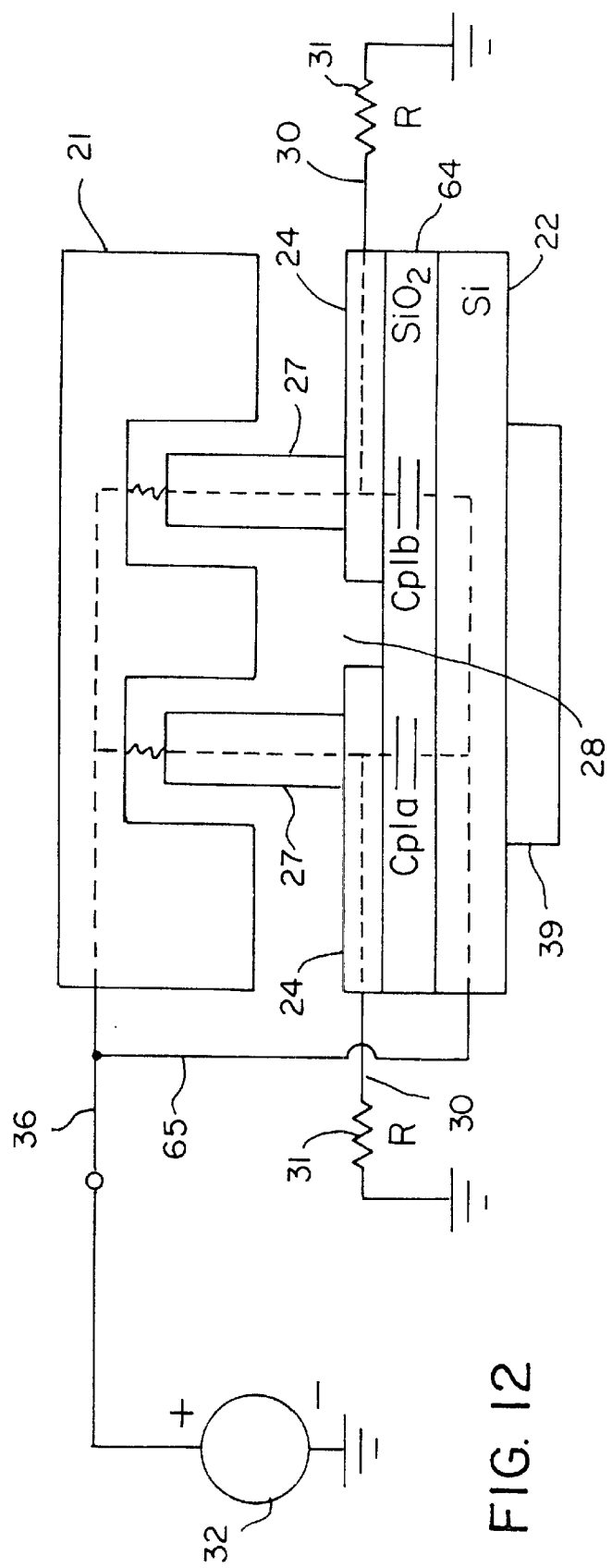
FIG. 12 is a simplified side view of micro-electro-discharge machining apparatus utilizing the parasitic capacitances between the interconnect lines and a conductive substrate rather than discrete external capacitors.

In accordance with the invention, the parasitic distributed capacitances $C_{p1}$ formed between the conductive substrate 22 and the interconnect lines 24, separated by a dielectric insulating layer 64 (e.g., $SiO_2$ formed on a top face surface 25 of a silicon substrate), may be utilized as the capacitances 37 in the RC circuits. In this arrangement, as illustrated in FIG. 12, the positive terminal of the power source 32 is connected not only to the workpiece 21 but also via a conducting line 65 to the substrate 22, e.g., crystalline silicon doped to make it a good conductor. The external capacitors 37 of FIG. 1 are thus completely eliminated. The interconnect lines 24 on the substrate are connected through the resistors 31 to the negative terminal of the power source 32, e.g., through a ground connection as shown in FIG. 12. This configuration also reduces cross-talk between the electrodes 27. The resistors 31 may also be integrated in the interconnect lines 24 on the substrate. The use of integrated resistors also allows the number of contact pads to be reduced.

Figure 13:
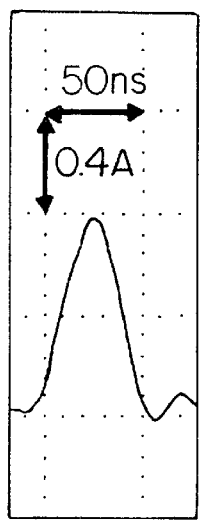
FIG. 13 is the trace of pulse discharge current for an electrode in an apparatus as illustrated in FIG. 12 in which several electrodes are electrically connected together to a single interconnect line.
Figure 14:
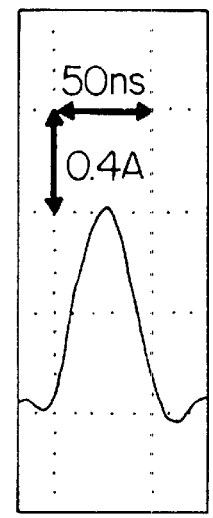
FIG. 14 is the trace of the pulse discharge current for an apparatus as shown in FIG. 12 in which each electrode is individually connected to an interconnect line.

The performance of the arrangement of FIG. 12 was evaluated for an exemplary micro-EDM apparatus having an array of five copper electrodes, each with a 100 μm×100 μm square cross-section. Using an 80 volt DC power supply 32, 50 μm machining depth was achieved in a stainless steel workpiece in 38 seconds at an average rate of 1.32 μm/s, and 100 μm depth was achieved in 86 seconds at an average rate of 1.16 μm/s. The machining rates were found to be the same whether a single electrode 27 was connected to a single external resistor 31 or if all five electrodes were connected to five separate resistors. In this evaluation, only one electrode was permitted to touch the workpiece at a time. The smoothness of the machined surfaces for both the single electrode/single resistor circuit and the five electrode/five resistor circuit arrangement were found by visual inspections to be comparable to the best smoothness achieved by conventional EDM pulse generators. The pulse shape for the single resistor circuit is shown in FIG. 13 and the pulse shape for the five circuits is shown in FIG. 14. It is seen that the current pulses of FIGS. 13 and 14 are of intermediate amplitude as compared to the current pulses of FIGS. 9 and 10.

A measure of precision in micro-EDM is the tolerance between an electrode and the hole machined by it. In general, the conventional circuit configuration in which all electrodes are connected in parallel to a single RC pair provides the largest tolerance, and lowest precision, while the micro-EDM apparatus in accordance with the invention utilizing the parasitic capacitances as shown in FIG. 12 provides the lowest tolerances and the best precision.

Figure 15:
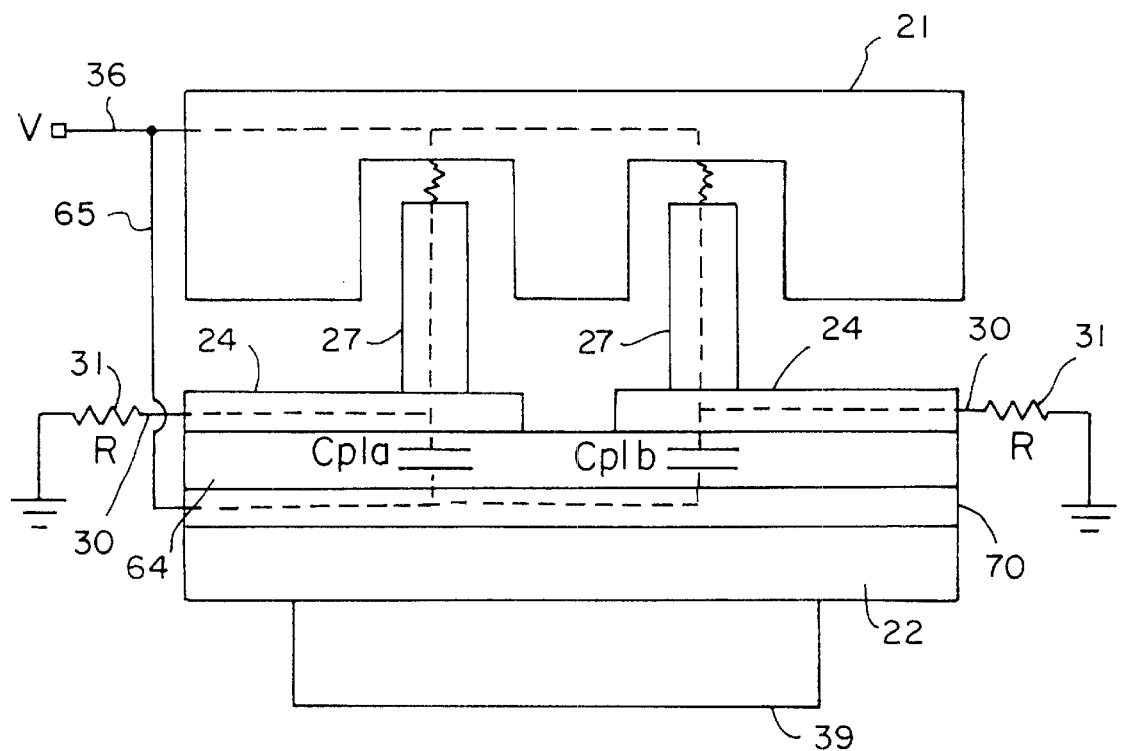
FIG. 15 is a simplified side view of micro-discharge-machining apparatus formed on a dielectric substrate on which a conductive layer and an insulating layer are deposited to form distributed capacitances with the interconnect lines.

The micro-electro-discharge machining apparatus of the present invention may also be formed utilizing a highly insulating dielectric substrate (e.g., glass or ceramic such as $Al_2O_3$) with integrated capacitors formed on the substrate. An example of such apparatus is shown in FIG. 15 in which the substrate comprises a dielectric base substrate 22 with a layer of conductor 70 formed thereon, e.g., a conducting metal such as copper sputtered thereon, or a layer of highly doped polysilicon deposited on the substrate. An insulating layer 64, e.g., $SiO_2$, may then be deposited over the conducting layer 70, and the interconnect lines 24 and electrodes 27 formed on the insulating layer 64 as discussed above. In this case, the electrical conducting line 65 is connected to the conducting layer 70. The distributed capacitors 37 are thus formed between the interconnect lines 64 and the conducting layer 70. If desired, the conducting layer 70 may be patterned to correspond to and underlie the pattern of interconnect lines 24 or otherwise patterned to provide appropriate capacitances between the interconnect lines and the conducting layer.

Figure 16:
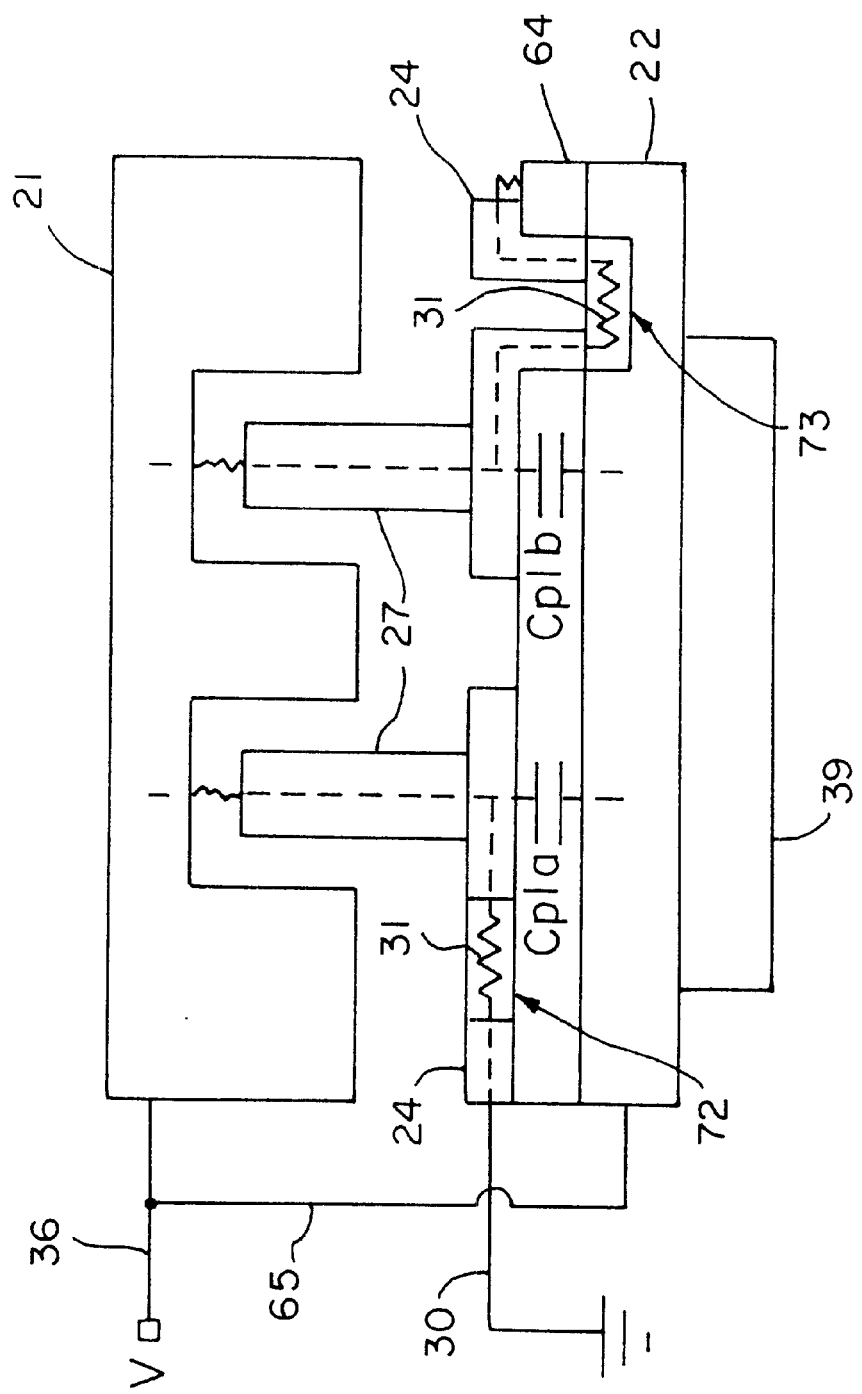
FIG. 16 is a simplified side view of micro-electro-discharge machining apparatus having resistors formed on the substrate that are integrated with the interconnect lines.
Figure 17:
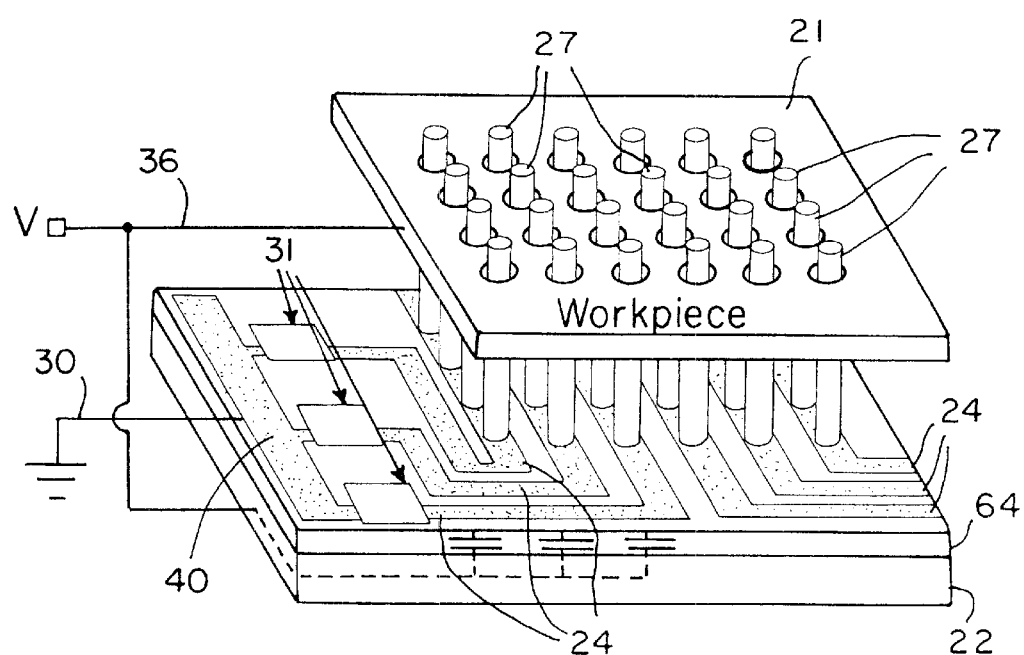
FIG. 17 is a simplified perspective view of micro-electro-discharge machining apparatus having resistors integrated with the interconnect lines and a common contact pad for several interconnect lines.

The resistors 31 may also be integrated with the interconnect lines on the substrate so that both the capacitors and the resistors in the RC circuits for each electrode are fully integrated onto the substrate. Micro-EDM apparatus in accordance with the invention having integrated resistors is illustrated in FIGS. 16 and 17. As shown in FIG. 16, integrated resistors 31 may be formed in various manners, including resistors defined by material 72 deposited on the surface of the insulating layer 64 which bridges a gap in the interconnect conducting lines 24. The material 72 forming the resistor 31 may comprise, for example, doped polysilicon deposited on the conducting layer or a metal having a higher resistance than that of the (e.g., copper) interconnects 24. Another way of forming the integrated resistors on a semiconductor substrate is also illustrated in FIG. 16, wherein a region 73 of a p-type Si substrate 22 has dopants diffused or implanted therein to form the resistor 31, with an opening being formed in the insulating layer 64 to expose the doped region 73. The metal interconnect lines 24 may then be deposited to make contact with end areas of the resistor region 73 as shown in FIG. 16.

As illustrated in FIG. 17, where the resistors 31 are integrated onto the substrate of the apparatus, each of the interconnect lines 24 extending to the integrated resistors 31 may be connected to a common conducting pad or terminal 40, as illustrated in FIG. 17. Because the RC circuit for the electrodes is now formed on the substrate itself, the common terminal 40 can be used to provide voltage to each of the RC circuits, thereby greatly decreasing the number of contact pads required, and in appropriate cases allowing a single contact pad to be utilized.

It is understood that the invention is not limited to the particular embodiments set forth herein as illustrative, but embraces all such forms thereof as come within the scope of the following claims.

What is claimed is:

1. Micro-electro-discharge machining apparatus comprising:
   (a) an electrically conductive substrate having a surface;
   (b) an insulating layer formed on the surface of the substrate;
   (c) a plurality of electrically conductive electrodes formed on the insulating layer in an array and extending upwardly away from the surface of the substrate; and (d) a plurality of electrical interconnect lines formed on the insulating layer, each of said interconnect lines in electrical contact with at least one electrode to allow current to be supplied thereto through the interconnect line, each interconnect line defining a capacitor with the substrate and separated therefrom by the insulating layer, and a resistor having a selected resistance electrically connected to each interconnect line.

2. The machining apparatus of claim 1 further comprising:

(a) an electrical power source having a positive terminal and a negative terminal; and (b) a conductor electrically connecting one of the terminals of the power source to the substrate with that terminal of the power source available to be connected to a workpiece to be machined, and a conductor electrically connecting the other terminal of the power source to each of said interconnect lines through the resistor for each interconnect line.

3. The machining apparatus of claim 2 wherein the selected resistance of the resistors are equal.

4. The machining apparatus of claim 2 wherein the conductor connecting the interconnect lines to the terminal of the power source includes a conductor at ground potential.

5. The machining apparatus of claim 2 further including a workpiece to be machined positioned adjacent to the electrodes to receive current therefrom and connected by a conductor to the positive terminal of the power source, the electrodes connected to the negative terminal through the interconnect lines, resistors, and conductors, and dielectric oil between the workpiece and the electrodes.

6. The machining apparatus of claim 1 wherein each of said electrodes has a height above the substrate surface of less than 500 m and the spacing between adjacent electrodes in the array is less than 500 m.

7. The machining apparatus of claim 1 wherein the substrate is formed of silicon doped to be conductive.

8. The machining apparatus of claim 1 wherein the electrodes are formed of electroplated metal.

9. The machining apparatus of claim 8 wherein the electroplated metal forming the electrodes is copper.

10. The machining apparatus of claim 1 wherein there is a separate interconnect line for each of said electrodes, each of said interconnect lines being connected to one of said electrodes.

11. The machining apparatus of claim 1 wherein each of said interconnect lines is electrically connected to two or more electrodes from the plurality of electrodes to connect the two or more electrodes in parallel with each other.

12. The machining apparatus of claim 1 wherein each of the electrodes has a shaped outer periphery that defines the shape of an opening to be cut into a workpiece.

13. The machining apparatus of claim 1 wherein each of the electrodes has an outer electrode wall with an outer periphery and an inner periphery that surrounds and defines at least one cavity in the electrode that defines the shape of a part to be cut from a workpiece.

14. The machining apparatus of claim 13 wherein the inner periphery of the outer electrode wall defines the shape of a gear.

15. The machining apparatus of claim 1 further including a vibrator coupled to the substrate that is activatable to vibrate the substrate and electrodes in a direction perpendicular to the face surface of the substrate.

16. The machining apparatus of claim 1 wherein the electrodes are arranged in a rectangular array with at least four rows and four columns of the electrodes in the array.

17. The machining apparatus of claim 1 wherein the substrate comprises a dielectric base substrate and a conducting layer formed thereon, the insulating layer formed on the conducting layer.

18. The machining apparatus of claim 1 wherein the resistors are formed on the substrate integrated with the interconnect lines.

19. A method of micro-electro-discharge machining comprising:

(a) providing a plurality of micro-electro-discharge electrodes arranged in an array on a substrate;

(b) positioning the electrode array adjacent to a workpiece to be machined with dielectric fluid between the electrodes and the workpiece; and (c) applying a continuous voltage between the workpiece and each electrode individually to charge a capacitor electrically connected between the workpiece and each electrode until the charge on the capacitor builds to a sufficient level to provide a discharge of current between each electrode and the workpiece to electromachine the workpiece.

20. A method of claim 19 including the step of connecting a discrete capacitor between the workpiece and each electrode which is charged as voltage is applied between the workpiece and the electrodes.

21. The method of claim 19 wherein the substrate is electrically conductive and is electrically insulated from the electrodes by an insulating layer and including the step of electrically connecting the substrate to the workpiece to apply a voltage between the substrate and the electrodes, and providing interconnect lines on the insulating layer extending to each electrode which define a capacitor with the substrate which is charged as the voltage is applied individually between each electrode and the workpiece.

22. Micro-electro-discharge machining apparatus comprising:

(a) a substrate having a surface;

(b) a plurality of electrically conductive electrodes formed on the substrate in an array and extending upwardly away from the surface of the substrate;

(c) a plurality of electrical interconnect lines formed on the substrate, each interconnect line in electrical contact with at least one of the electrodes to allow current to be supplied thereto through the interconnect line;

(d) an electrical power source having a positive terminal and a negative terminal; and (e) a conductor electrically connecting one of the terminals of the power source to the interconnect lines through a resistor for each interconnect line that has a selected resistance, and a capacitor connected to each interconnect line and to the other terminal of the power source.

23. The machining apparatus of claim 22 wherein the selected resistance of the resistors are equal.

24. The machining apparatus of claim 22 wherein the conductor connecting the interconnect lines to the terminal of the power source includes a conductor at ground potential.

25. The machining apparatus of claim 22 wherein each electrode has a height above the substrate face surface of less than 500 $\mu$m and the spacing between adjacent electrodes in the array is less than 500 $\mu$m.

26. The machining apparatus of claim 22 further including a workpiece to be machined positioned adjacent to the electrodes to receive current therefrom and connected by a conductor to the positive terminal of the power source, the electrodes connected to the negative terminal through the interconnect lines, resistors and conductors, and dielectric oil between the workpiece and the electrodes.

27. The machining apparatus of claim 22 wherein the substrate is formed of silicon doped to be conductive with an insulating layer over the silicon, the electrodes formed on the insulating layer.

28. The machining apparatus of claim 22 wherein the electrodes are formed of electroplated metal.

29. The machining apparatus of claim 28 wherein the electroplated metal forming the electrodes is copper.

30. The machining apparatus of claim 22 wherein there is a separate interconnect line for each of the electrodes, each of said interconnect lines connected to one of the electrodes.

31. The machining apparatus of claim 22 wherein each of said interconnect lines is electrically connected to two or more electrodes from the plurality of electrodes to connect the two or more electrodes in parallel with each other.

32. The machining apparatus of claim 22 wherein each of the electrodes has a shaped outer periphery that defines the shape of a part to be cut from a workpiece.

33. The machining apparatus of claim 22 wherein each of the electrodes has an outer electrode wall with an outer periphery and an inner periphery that surrounds and defines at least one cavity in the electrode.

34. The machining apparatus of claim 33 wherein inner periphery of the outer electrode wall defines the shape of a gear.

35. The machining apparatus of claim 22 further including a vibrator coupled to the substrate activatable to vibrate the substrate and electrodes in a direction perpendicular to the face surface of the substrate.

36. The machining apparatus of claim 22 wherein the substrate comprises a dielectric base substrate and a conducting layer formed thereon, the insulating layer formed on the conducting layer, the conducting layer connected by the conductor to the one terminal of the power source.

37. The machining apparatus of claim 22 wherein the resistors are formed on the substrate integrated with the interconnect lines.

38. Micro-electro-discharge machining apparatus comprising:

(a) an electrically conductive substrate having a surface;

(b) an insulating layer formed on the surface of the substrate;

(c) a plurality of electrically conductive electrodes formed on the insulating layer in an array and extending upwardly away from the surface of the substrate; and (d) an electrical interconnect line formed on the insulating layer, the interconnect line in electrical contact with the electrodes to allow current to be supplied thereto in parallel through the interconnect line, the interconnect line defining a capacitor with the substrate and separated therefrom by the insulating layer, and a resistor having a selected resistance electrically connected to the interconnect line.

39. The machining apparatus of claim 38 further comprising:

(a) an electrical power source having a positive terminal and a negative terminal; and (b) a conductor electrically connecting one of the terminals of the power source to the substrate with that terminal of the power source available to be connected to a workpiece to be machined, and a conductor electrically connecting the other terminal of the power source to the interconnect line through the resistor.

40. The machining apparatus of claim 39 further including a workpiece to be machined positioned adjacent to the electrodes to receive current therefrom and connected by a conductor to the positive terminal of the power source, the electrodes connected to the negative terminal through the interconnect line, resistor, and conductor, and dielectric oil between the workpiece and the electrodes.

41. The machining apparatus of claim 38 wherein each of the electrodes has a height above the substrate surface of less than 500 m and the spacing between adjacent electrodes in the array is less than 500 m.

42. The machining apparatus of claim 38 wherein the substrate is formed of silicon doped to be conductive.

43. The machining apparatus of claim 38 wherein the electrodes are formed of electroplated metal.

44. The machining apparatus of claim 38 wherein each of the electrodes has a shaped outer periphery that defines the shape of an opening to be cut into a workpiece.

45. The machining apparatus of claim 38 wherein the substrate comprises a dielectric base substrate and a conducting layer formed thereon, the insulating layer formed on the conducting layer.

46. The machining apparatus of claim 38 wherein the resistor is formed on the substrate as part of one or more of the interconnect lines.

\* \* \* \* \*